United States Patent [19]

Thalmann

[11] Patent Number: 4,624,487
[45] Date of Patent: Nov. 25, 1986

[54] MOLDED TAPPING FITTING FOR CONNECTING A BRANCH LINE TO A PIPELINE

[75] Inventor: Alfred Thalmann, Uhwiesen, Switzerland

[73] Assignee: Georg Fischer Aktiengesellschaft, Schaffhausen, Switzerland

[21] Appl. No.: 762,952

[22] Filed: Aug. 6, 1985

[30] Foreign Application Priority Data

Aug. 8, 1984 [CH] Switzerland .................. 3812/84

[51] Int. Cl.[4] ........................................ F16L 41/00
[52] U.S. Cl. .................................. 285/197; 285/21; 285/423
[58] Field of Search ................... 285/21, 197, 423

[56] References Cited

U.S. PATENT DOCUMENTS

| 1,908,821 | 5/1933 | Cornell | 285/197 |
| 3,987,276 | 10/1976 | Vogelsanger | 285/21 X |
| 4,415,000 | 11/1983 | Odmann | 285/197 X |
| 4,455,482 | 6/1984 | Grandclement | 285/21 X |

Primary Examiner—Richard J. Scanlan, Jr.
Attorney, Agent, or Firm—Toren, McGeady, Stanger, Goldberg & Kiel

[57] ABSTRACT

A molded tapping fitting is made up of a saddle piece to be secured to a pipeline to be tapped, a tapping connection member and a branch connection line attached to the saddle piece. In combination, the saddle piece, the tapping connection member and the branch connection line form a chamber opening through the saddle piece into the pipeline. The interior of the chamber is shaped to facilitate the deflection of flow from the pipeline into the branch connection line.

10 Claims, 4 Drawing Figures

4,624,487

MOLDED TAPPING FITTING FOR CONNECTING A BRANCH LINE TO A PIPELINE

BACKGROUND OF THE INVENTION

The present invention is directed to a molded tapping fitting for connecting a branch line to a pipeline and includes a shell-shaped saddle piece arranged to be placed on the pipeline, an axially extending tapping connection member through which a tapping tool is inserted, and an axially extending tubular branch connection line, with the saddle piece, the tapping connection member and the branch connection line combining to form the fitting.

Molded tapping fittings are known which can be connected to a pipeline, for example note the welding connection in Switzerland Pat. No. 528697 or the clamped connection in Switzerland Pat. No. 464620. The branch connection line is secured to the tapping fitting at a position which results in a large constructional height whereby the deflection of the flow medium is not facilitated.

SUMMARY OF THE INVENTION

Therefore, it is the primary object of the present invention to provide a molded tapping fitting of the type described above which has a small constructional height and facilitates the flow from the pipeline to the branch line.

In accordance with the present invention, the tapping fitting is formed of a shell-shaped saddle piece which fits at least partly around the pipeline, a tubular tapping connection member is secured to the saddle piece so that a tapping tool can be inserted for forming an opening into the pipeline. A branch connection line is fitted to the saddle piece at the connection of the tubular connection member to the saddle piece. The combination of the saddle piece, the tapping connection member and the branch connecting line form a chamber for facilitating flow from the pipeline into the branch line.

Due to the arrangement of the chamber opening through the saddle piece, the flow exiting from the pipeline is deflected into the branch line in a favorable manner. Further, the arrangement of the chamber enables the bore through the branch connecting line to be positioned closely adjacent to the crown of the saddle piece so that the overall height of the tapping fitting is reduced.

If the molded tapping fitting is secured on the pipeline by welding using a resistance wire mat, the mat is adapted to the chamber which opens into an opening through the wall of the saddle piece with the resistance wire mat defining an opening by the arc-shaped arrangement of the resistance wires so that the opening through the mat aligns with the opening through the saddle piece and with the chamber. Accordingly, when the pipeline is tapped, it is unnecessary to cut through any of the resistance heating wires whereby the cutting process is considerably simplified. By fastening the resistance wire mat at the crown of the saddle piece, slippage of the mat during placement and welding is avoided and the mat and the saddle piece can be securely pressed against the pipe in a uniform manner on opposite sides of the pipe so that an effective welding connection is made.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
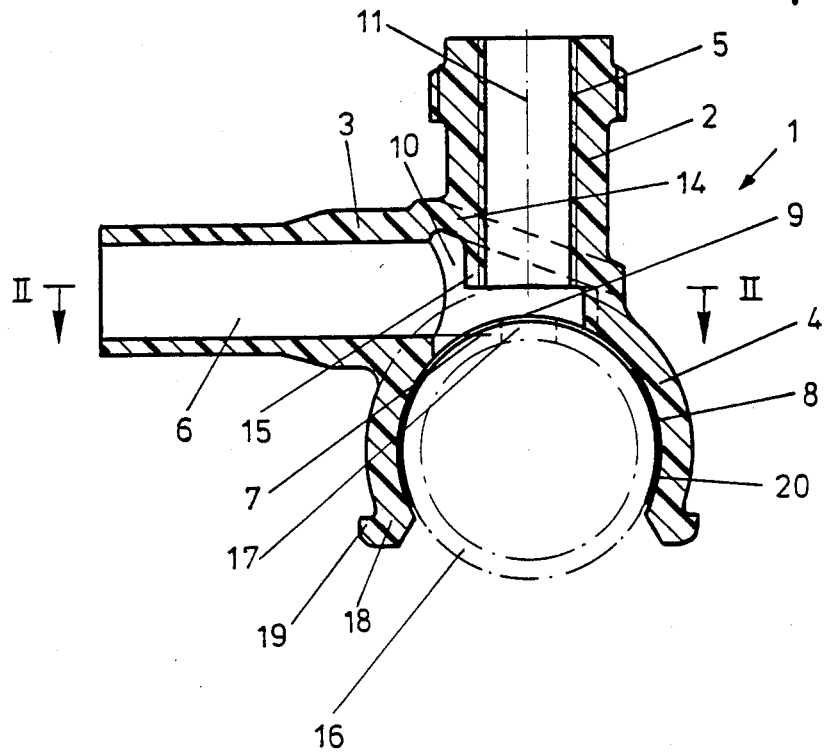
FIG. 1 is a cross-sectional view of a molded tapping fitting embodying the present invention.

The molded tapping fitting 1 is shown in FIG. 1 and is made up of a tapping connection member 2, a branch connection line 3 and a shell-shaped saddle piece 4. The tapping connection member 2 has an axially extending bore with an internal thread 5 for receiving a tapping tool, not shown.

The branch connection line 3 is a tubular member forming a bore 6 for conveying the flow of a medium from a pipeline into a branch line. The bore 6 in the branch connection line 3 is arranged on the exterior of the saddle piece 4 so that the extension line 7 of the invert of the bore 6, as viewed in FIG. 1, projects toward the saddle piece and is located inwardly from the crown line 9 on the circular inner circumference 8 of the saddle piece.

Figure 2:
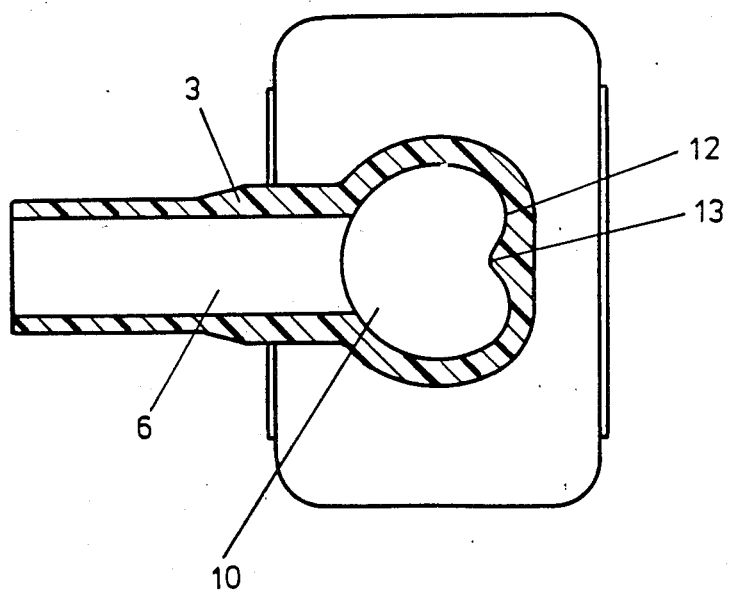
FIG. 2 is a sectional view taken along the line II—II in FIG. 1.

The combination of the tapping connection member 2, the branch connection line 3 and the saddle piece 4 form a chamber 10 which opens through the inner circumference of the saddle piece and is shaped to facilitate flow between the pipeline on which the tapping fitting is mounted and the branch line connected to the branch connection line. The tapping connection member 2 has central axis 11 which extends transversely of the axis of the pipeline 16 on which the saddle piece 4 is mounted, note FIG. 1. The chamber 10 is generally round in section extending transversely of the axis 11 of the tapping connection member 2, however, it has a flatened portion 12, note FIG. 2, on the opposite side of the chamber from the connection of the branch connection line to the tubular connection member 2 and the saddle piece 4. In the flattened portion 12 an inwardly directed flow projection 13 is aligned with the axial center of the bore 6 through the branch connection line 3.

As illustrated in FIG. 1, the chamber 10 is defined, starting from the upper edge of the bore 6 in the branch connection line 3, by an inclined upper chamber wall 14 extending downwardly from the branch connection line toward the opposite side of the tubular connection member 2 to the flattened portion 12.

The tapping connection member 2 projects at its lower end 15 into the chamber 10 so that the internal thread 5 has a straight end extending perpendicularly of the axis 11 and located close to the tapping location of the pipeline 16.

After setting the molded tapping fitting 1 on the pipeline 16 and fastening the fitting, such as by welding or clamping, to the pipeline, a tapped borehole 17 can be formed through the pipeline 16 by a tapping work tool inserted through the tubular tapping connection member 2.

The molded tapping fitting described above is preferably formed from a plastics material in an injection molding operation and it is used for producing branch lines in a plastics material pipeline system.

The attachment of the molded tapping fitting 1 on the pipeline 16 can be effected in plastics material pipelines by a welded connection using a resistance wire mat 20.

Figure 3:
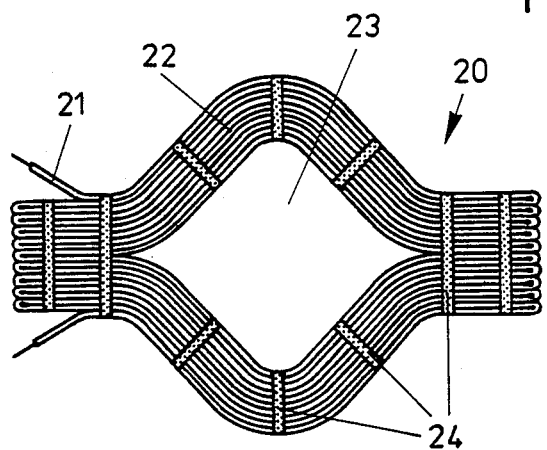
FIG. 3 is a plan view of the resistance wire mat in a flat state.

In FIG. 3 the wire mat 20 is shown laid flat. The mat is formed of resistance heating wire 21 arranged in a zig-zag pattern and sheathed in plastics material. The resistance heating wires extend in side-by-side relation along one another and are bent preferably in a central area of the mat according to the monofil windings of a rectangular mat so that a central opening 23 extends through the mat between two arc-shaped parts 22. The wires 21 extending alongside one another are connected together by welded strips 24 which extend transversely of the wires. The resistance wire mat is inserted in the saddle piece 4 so that the opening 23 in the mat circles the area of the tapped bore 17 into the pipeline 16. Preferably, the mat is fastened symmetrically on both sides of the crown line 9 of the saddle piece 4 so that it is located on both of the opposite sides of the chamber separated by the crown line. The mat 20 is secured in place by a welding action. Short-circuits are prevented by means of the monofil winding of the resistance wire mat 20.

As displayed in FIG. 1, the molded tapping fitting 1 with the saddle piece 4 and the correspondingly bent heating wire mat 20 is placed on the radially outer surface of the pipeline 16. As viewed in FIG. 1 the saddle piece 4 in section is U-shaped and extends for a circumferential angle of more than 180°, preferably in the range of 210° to 240°, so that it fits securely on the outside of the pipeline 16 with a snap-like connection. The free ends of the saddle piece 4, that is, the lower ends as viewed in FIG. 1, form tension flanges 19 at the ends 18 corresponding to the opposite circumferential ends of the saddle piece. By means of a tensioning device, not shown, acting on the tension flanges 19, the saddle piece 4 is pressed against the pipe so that the contact pressure is maintained during the subsequent welding operation. The force exerted on the saddle piece 4 produces a tension force acting on the circumference providing a radially directed pressing action between the saddle piece, the heating mat and the pipe so that the requisite melting or fusing pressure is produced during the welding operation. After the welding operation is completed, the tapped bore 17 is cut in the pipeline 16 by a tapping tool inserted through the tapping connection member and a branch line can be connected to the branch connecting line by a weld connection. Since the heating wires in the mat 20 are positioned outwardly from the chamber opening to the pipeline, it is not necessary to cut through the wires when the tapping operation is effected with the result that the tapping procedure is considerably simplified.

The flow medium passing through the pipeline 16 exits through the tapped bore 17 and is deflected in the chamber 10 into the branch line in a favorable manner.

Figure 4:
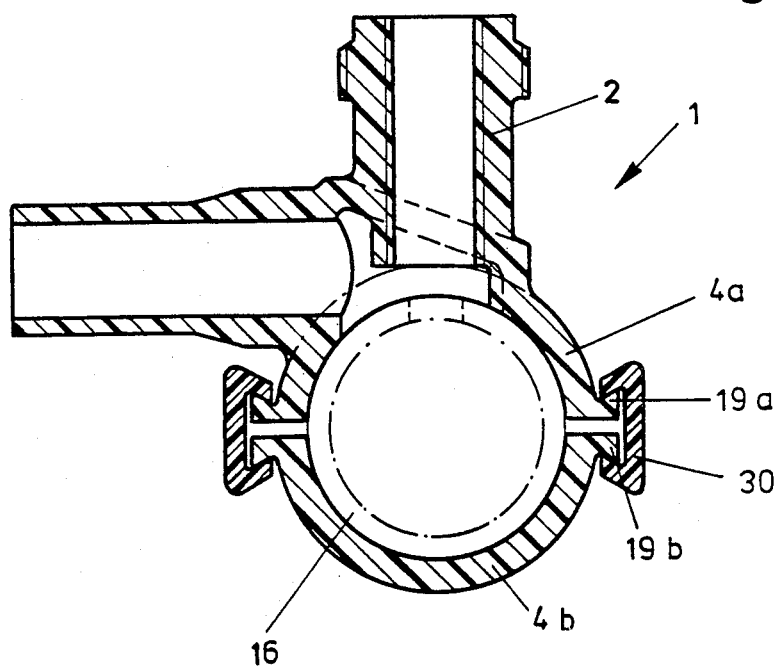
FIG. 4 is a cross-sectional view similar to FIG. 1 illustrating another embodiment of the present invention.

It is also possible to secure the molded tapping fitting 1 on the pipeline by a clamped connection as shown in FIG. 4.

In FIG. 4, the saddle piece 4a of the molded tapping fitting 1 extends around approximately one-half of the circumference of the pipe 16 and has tension flanges 19a located at the circumferentially spaced ends of the saddle piece. The flanges have a wedge-like or dovetail like shape extending in the axial direction of the pipe. A seal, not shown, is positioned between the inside circumference of the molded tapping fitting 1 and the outside circumference of the pipe 16 and ensures a tight connection around the opening from the chamber to the interior of the saddle piece. A second saddle piece 4b with corresponding tension flanges 19b extends circumferentially around the other half of the pipeline 16 so that the two saddle pieces 4a, 4b can be tightly secured around the pipeline by means of the connection wedge member 30.

The clamping connection can also be provided by screws or other connecting elements. The connection using clamping members is also suitable for pipelines and molded tapping fittings of metal or where the pipeline and the molded tapping fitting are formed of different materials.

While specific embodiments of the invention have been shown and described in detail to illustrate the application of the inventive principles, it will be understood that the invention may be embodied otherwise without departing from such principles.

I claim:

1. Molded tapping fitting for connecting a branch line to a pipeline comprising a shell-shaped saddle piece arranged to be radially placed on and secured to the pipeline, said saddle piece having an axis corresponding generally to the axis of the pipeline, an axially extending tubular tapping connection member having a first end and a second end with the second end secured to said saddle piece, the axis of said tapping connection member extends transversely of the axis of said saddle piece, and axially extending tubular branch line connection with the axis thereof extending transversely of the axes of said saddle piece and of said tapping connection member and said branch line secured to and intersecting said tapping connection member, said saddle piece having a circumferentially extending inside surface arranged to seat against the pipeline and a circumferentially extending outside surface, said branch connection line intersecting said tapping connection member adjacent the outside surface of said saddle piece, said saddle piece having an opening therethrough from the outside surface to the inside surface with the opening aligned with said tapping connection member, and, in combination, said saddle piece said tapping connection member and said branch connection line forming a chamber opening to said opening in said saddle piece for facilitating flow between said branch connection line and the pipeline, said chamber spaced outwardly from said saddle piece and extending transversely of the tapping connection member axis is formed by a surface inclined from said branch connection line adjacent the intersection with said tapping connection member to the opposite side of said tapping connection member adjacent the connection between said tapping connection member and said saddle piece.

2. Molded tapping fitting, as set forth in claim 1, wherein said chamber in section extending transversely of the axis of said tapping connection member being generally round and having a flattened side on the opposite side of the tapping connection member axis from said branch connection line.

3. Molded tapping fitting, as set forth in claim 1 or 2, wherein said branch connection line having an invert line projecting into said saddle piece so that the projection of the invert line is located radially iwardly from the intersection of the axis of said tapping connection member with the outer circumferential surface of said saddle member.

4. Molded tapping fitting, as set forth in claim 1 or 2, wherein said saddle piece said tapping connection member and said branch connection line are formed monolithically, and a resistance heating wire mat incorporated in said saddle piece for effecting a welding connection to the pipeline.

5. Molded tapping fitting, as set forth in claim 4, wherein said wire mat forms an opening therethrough for providing an opening from said chamber into the pipeline.

6. Molded tapping fitting, as set forth in claim 5, wherein said wire mat is secured to said saddle piece symmetrically on opposite sides of the projection of the axis of said tapping connection member into said saddle piece.

7. Molded tapping fitting, as set forth in claim 5, wherein said wire mat includes arc-shaped wires forming the opening therethrough.

8. Molded tapping fitting, as set forth in claim 1 or 2, wherein said saddle piece is shaped to extend circumferentially around the pipeline through a maximum angle of 240°.

9. Molded tapping fitting, as set forth in claim 7, wherein the opposite ends of said saddle piece in the circumferential direction thereof extend in the axial direction of the pipeline and form tension flanges whereby a tensioning device can be secured to said tension flanges during the welding process for pressing said saddle piece against the pipeline.

10. Molded tapping fitting, as set forth in claim 1 or 2, including a clamping connection for securing said saddle piece on the pipeline.

* * * * *